Nov. 11, 1952        G. A. MATTHEWS        2,617,978

ELECTRICAL REGULATING APPARATUS

Filed May 29, 1950        5 Sheets-Sheet 1

INVENTOR.
GEORGE A. MATTHEWS
BY Whittemore,
Hulbert & Belknap
ATTORNEYS

Nov. 11, 1952  G. A. MATTHEWS  2,617,978
ELECTRICAL REGULATING APPARATUS
Filed May 29, 1950  5 Sheets-Sheet 2

INVENTOR.
GEORGE A. MATTHEWS
BY Whittemore,
Hulbert & Belknap
ATTORNEYS

Nov. 11, 1952 G. A. MATTHEWS 2,617,978
ELECTRICAL REGULATING APPARATUS
Filed May 29, 1950 5 Sheets-Sheet 3

INVENTOR.
GEORGE A. MATTHEWS
BY Whittemore
Hulbert & Belknap
ATTORNEYS

Nov. 11, 1952    G. A. MATTHEWS    2,617,978
ELECTRICAL REGULATING APPARATUS
Filed May 29, 1950    5 Sheets-Sheet 4

INVENTOR.
GEORGE A. MATTHEWS
BY Whittemore
Hulbert & Belknap
ATTORNEYS

Nov. 11, 1952     G. A. MATTHEWS     2,617,978
ELECTRICAL REGULATING APPARATUS Filed May 29, 1950     5 Sheets-Sheet 5

INVENTOR.
GEORGE A. MATTHEWS
BY Whittemore,
Hulbert & Belknap
ATTORNEYS

Patented Nov. 11, 1952

2,617,978

UNITED STATES PATENT OFFICE 2,617,978

ELECTRICAL REGULATING APPARATUS

George A. Matthews, Detroit, Mich., assignor to The Detroit Edison Company, Detroit, Mich., a corporation of New York Application May 29, 1950, Serial No. 165,017

22 Claims. (Cl. 323—43.5)

The present invention relates to electrical regulating apparatus and more particularly, apparatus for regulating voltage under load.

Briefly described, it comprises essentially rotary windings having a traveling brush or contact engaging said rotary windings, and an electrically open collector ring electrically connected to the winding, in combination with contact means engaging the collector ring. The contact means may comprise a pair of spaced contacts engaging the collector ring and associated with a preventive auto transformer. Depending on the rating of the apparatus, in order to prevent arcing at the contact means, switches are provided in the lines connecting the last mentioned contacts and the auto transformers so that in the case of oil cooled transformers or the like, the arcing incident to breaking the circuit takes place outside of the tank.

The present invention relates broadly to dry or oil-filled electrical regulating apparatus wherein it is desired to effect variation in the number of turns of an electrical winding while energized and carrying load. The invention is illustrated primarily as applied to a three phase regulator and a three phase regulating transformer but it will be understood that the disclosure of the regulating apparatus in the combination shown is merely illustrative and that the invention is applicable broadly to any type of electrical regulating apparatus in which it is desirable to effect changes in the number of turns of an electrical winding.

It is an object of the present invention to provide turn varying electrical apparatus having a rotatable winding with associated contacts, a collector ring with associated contacts and connected equipment providing for low electrical loss and high electrical conductivity.

It is a further object of the present invention to provide an electrical regulator comprising a rotary winding connected to an electrically open collector ring, one or more contacts engaging the collector ring, and means for preventing arcing between the contacts and collector ring.

It is a further object of the present invention to provide electrical regulating apparatus comprising a rotary winding disposed in a helical path on an insulating rotary support, a traveling contact having means engageable with the winding and movable axially of the support upon rotation thereof, an electrically open collector ring electrically connected to the windings and contact means engageing the open collector ring.

It is a further object of the present invention to provide in apparatus of the character described, an electrically open collector ring, a pair of spaced contacts engaging the collector ring and connected in parallel to opposite sides of a preventive auto-transformer, switch means intermediate each of said contacts and said preventive auto-transformer, and means effective to maintain the switches open as the opening in the rotating collector ring passes beneath the contact adjacent said switch.

It is a further object of the present invention to provide a multi-phase electrical regulator comprising a plurality of rotatable windings each electrically connected to an open collector ring, a traveling contact associated with each of said windings, stationary contact means associated with each collector ring, and motor means for rotating each of said windings and collector rings simultaneously.

It is a further object of the present invention to provide in apparatus of the character described a rotary open collector ring, circumferentially spaced stationary contacts engaging said collector ring and connected at opposite ends to a preventive auto-transformer, switch means intermediate each of said contacts and said transformer, and means operable upon rotation of said collector ring for maintaining each of said switches in open position as the gap or opening in the collector ring passes beneath the contact associated therewith, motor means for rotating said collector ring, and motor control means effective to prevent stopping of said collector ring except in a position in which both of said switches are closed.

Other objects and features of the invention will become apparent as the description proceeds, especially when taken in conjunction with the accompanying drawings, wherein.

In the past, efforts to employ a rotating type coil or winding have not met with practical success particularly for power applications. The greatest difficulty has been to design such apparatus which would perform satisfactorily in commercial ratings of regulators. The principal failure to meet commercial requirements in the past was due to the inability to provide simple and low electrical loss and high electrical conductivity means for taking off the current at the non-regulating end of the rotating winding.

According to the present invention a commercially practical device for this purpose has been provided which satisfies all commercial requirements and provides a complete apparatus capable of satisfactory operation under heavy loads.

Figure 1:
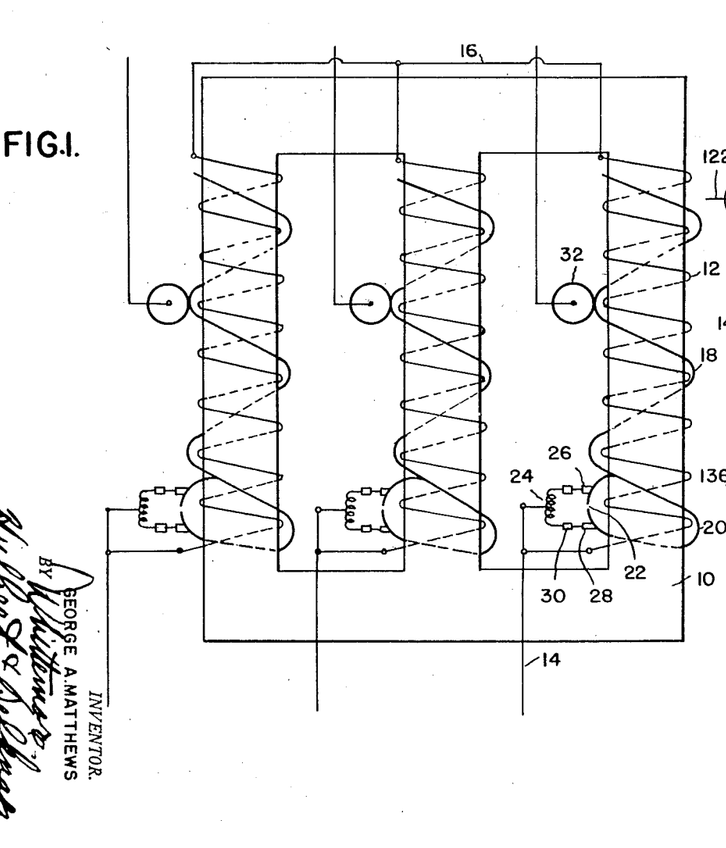
Figure 1 is a diagrammatic view of the improved electrical regulating apparatus embodied in a three phase regulator.

Referring now to the drawings, in Figure 1 there is illustrated a three phase regulator incorporating the present invention. This regulator comprises an iron core 10 having primary windings 12 associated with each leg. Each phase of the primary is connected to a source line 14 and at their opposite ends they are interconnected in a Y-connection by lines 16. The rotating windings are indicated at 18 and are electrically connected at one end to an open collector ring 20 having an insulating section therein diagrammatically indicated at 22. Each of the source lines 14 is connected to the mid-point of a preventive auto-transformer 24 and main contacts 26 and 28 are connected to opposite ends of the transformer. The contacts 26 and 28 are in electrical contact with the rotary collector ring. Switches 30 are provided between each contact 26 and 28 and the transformer 24.

A traveling contact 32 is provided having a contact element preferably in the form of a grooved roller engaging the bare conductor constituting the rotating winding 18. Rotation of the winding 18 will cause axial movement of the traveling contact 32. In the case where the invention is applied to a multi-phase system as illustrated, the traveling contacts 32 are preferably mechanically connected together to insure simultaneous travel axially of the rotating windings, and the rotating windings are preferably geared or otherwise connected together for simultaneous rotation.

The operation of the switches 30 and the means for actuating these switches will subsequently be described in detail.

Figure 2:
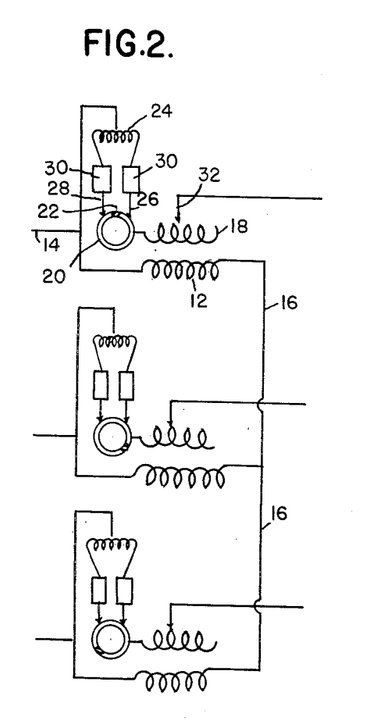
Figure 2 is a fragmentary circuit diagram of the regulator shown in Figure 1.

Referring now to Figure 2 there is illustrated a fragmentary simplified wiring diagram of the regulator diagrammatically disclosed in Figure 1, and like reference numerals have been applied thereto.

Figure 3:
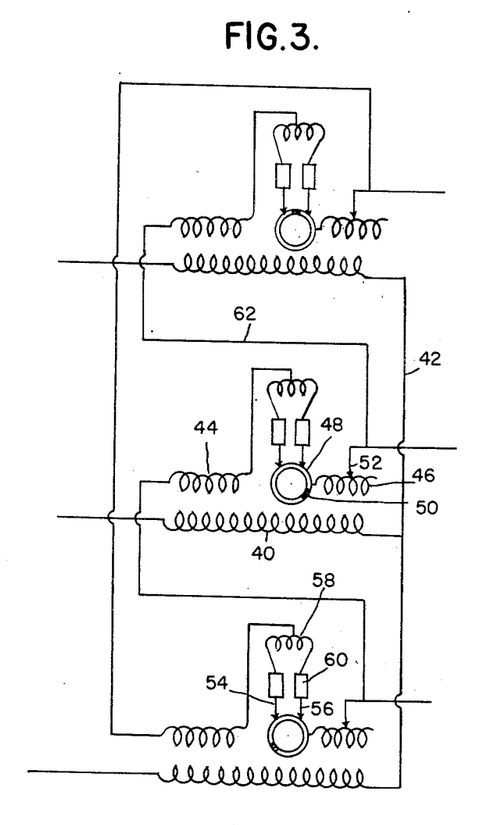
Figure 3 is a fragmentary circuit diagram of the invention incorporated in a regulating transformer.

Referring now to Figure 3 there is illustrated a fragmentary simplified wiring diagram of the invention applied to a regulating transformer. In this case the primary consists of the winding 40 interconnected in Y-relation by lines 42. Each phase of the secondary comprises a stationary winding 44 and a rotary winding 46. The rotary winding 46 is electrically connected to an open collector ring 48 having an insulating section 50 therein. A traveling contact 52 is associated with each of the rotary windings for movement axially thereof upon rotation of the rotary winding. Stationary contact means are provided in electrical contact with the open collector ring and comprises stationary contacts 54 and 56 which are connected to opposite ends of a preventive auto transformer 58. Intermediate each of the contacts 54 and 56 and the transformer 58 are switches 60 whose operation and function will subsequently be described. The mid-point of each auto-transformer 58 is connected to an end of the stationary secondary winding 44 so that the stationary winding 44 and so much of the rotary winding 46 as is connected in the circuit, in effect constitute a single secondary. Connections 62 are provided which are illustrated as connecting the secondaries in delta-relation. Both in this case and in the case of the regulator illustrated in Figures 1 and 2, it will be appreciated that the windings may be connected in either delta- or Y-relation.

Referring now to Figures 4 through 8 there is shown the detailed operation of a single phase of the regulating apparatus. It will be appreciated that these figures are diagrammatic and that the mechanism illustrated therein is applicable to voltage regulators, regulating transformers, or any electrical regulating apparatus depending upon variation in the number of turns of a winding to effect regulation.

Figure 4:
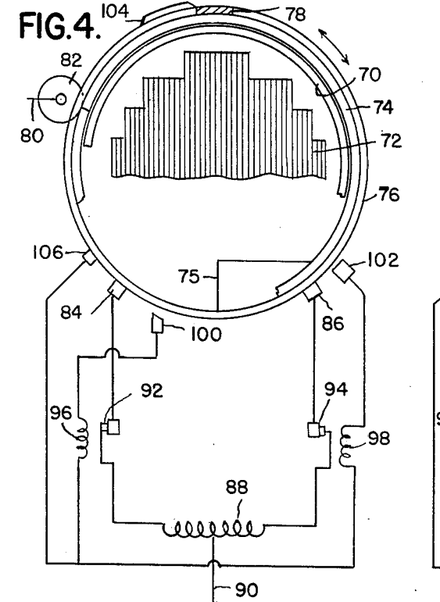
Figure 4 is a diagrammatic fragmentary sectional view of a single phase of electrical regulating apparatus showing control means for the stationary contacts associated with the collector ring.

In Figure 4 a portion of the primary winding is illustrated at 70 disposed about a core 72. A portion of the rotary winding is illustrated at 74 and this winding takes the form of a bare electrical conductor disposed in a helical path. At one end the rotary winding is electrically connected to an electrically open collector ring 76 as indicated at 75, which conveniently may be formed by providing an insulating section 78 therein.

A traveling contact 80 preferably including a rotary grooved roller 82, is provided in contact with the helically disposed rotary winding and is mounted for axial movement along the helix upon rotation of the winding. It will be readily apparent that rotation of the winding will therefore vary the number of turns in the circuit.

In order to take off current at the non-regulating end of the rotary winding, spaced stationary contacts 84 and 86 are provided in contact with the collector ring 76. Each of these contacts 84 and 86 is connected to opposite ends of a preventive auto-transformer 88 and the current is taken off from the mid-point of the auto-transformer by line 90. As is well understood, the purpose of the preventive auto-transformer is to limit the circulating current in the closed turn represented by the collector ring, contacts 84 and 86, and the preventive auto-transformer when the insulating section 78 of the collector ring is intermediate the contacts 84 and 86. At the same time, when current is being supplied to the line 90 through both of the contacts 84 and 86 the auto-transformer is ineffective since the turns at opposite sides of the mid-point are wound in the same direction, and the current is in opposite directions.

One form of the present invention is particularly useful in connection with large equipment of the types in which the windings are immersed in oil. In order to prevent arcing at contacts 84 and 86 when the insulating section 78 passes beneath the contacts 84 and 86, switches 92 and 94 are provided intermediate the contacts 84 and 86 respectively and the auto-transformer 88.

The switches 92 and 94 are normally closed as illustrated in Figure 4. However, automatic means are provided, actuated in timed relation with rotation of the rotary winding 74 and the collector ring 76 to open each of the switches 92 and 94 during passage of the insulating section 78 beneath the contacts 84 and 86 respectively. It is understood that these switches may be spring biased to closed or open position, but I have elected to illustrate the spring-biased closed application.

A simple means of accomplishing this result is to provide relay coils 96 and 98 respectively, adjacent the switches 92 and 94 in a position to open these switches when the relay coils are energized. The coil 96 is connected to a brush 100 and the coil 98 is connected to a brush 102, these brushes being axially spaced from the contacts 84 and 86 and spaced slightly outwardly from the collector ring 76. The collector ring is provided with an offset and raised contact portion 104 adapted to make contact with the brushes 100 and 102 upon rotation of the collector ring. A third brush 106 is provided to which one end of the relay coils 96 and 98 are connected in common, and the brush 106 is in constant contact with the collector ring 76.

With the parts in the position illustrated in Figure 4 it will be noted that the insulating section 78 of the collector ring is located intermediate the contacts 84 and 86. At this time since the contact 104 is separated from the brushes 100 and 102, neither of the coils 96 or 98 is energized and the switches 92 and 94 are therefore closed being spring biased to closed position. Accordingly, the circuit through the rotating winding is complete from the traveling contact 82 through the turns of the rotating winding between the traveling contact 82 and the open collector ring 76, whence the current is taken off through both of the contacts 84 and 86 in parallel, through the switches 92 and 94 respectively, and through the auto-transformer 88 to the line 90.

Figure 5:
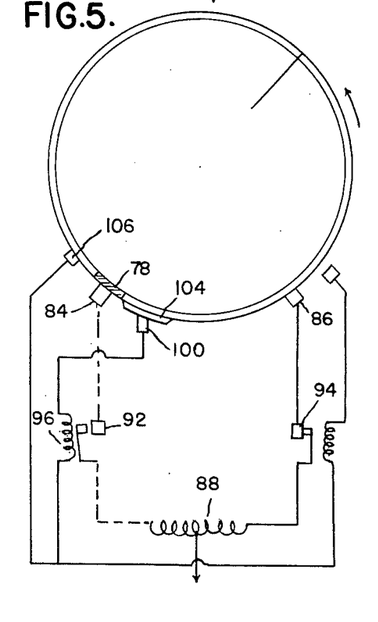
Figures 5, 6 and 7 are views similar to Figure 4 showing the collector ring in different positions of rotation.

If now, the rotating winding is rotated toward the position illustrated in Figure 5 (which is the counterclockwise rotation as seen in Figure 4) the raised contact 104 makes contact with the brush 100 and this takes place prior to movement of the insulating section 78 beneath the stationary contact 84. As soon as the brush 100 makes contact with the raised contact 104 a control circuit is completed through the relay coil 96 thereby opening the switch 92, this control circuit being completed to the brush 106. At this time current is taken off from the rotating winding through the stationary contact 86 and the switch 94 which remains closed. At this time current is taken off through only one-half of the auto-transformer 88 so that line current is therefore opposed by the reacting of half of the auto-transformer. This however offers no serious difficulty and moreover is a transient or temporary condition.

Figure 6:
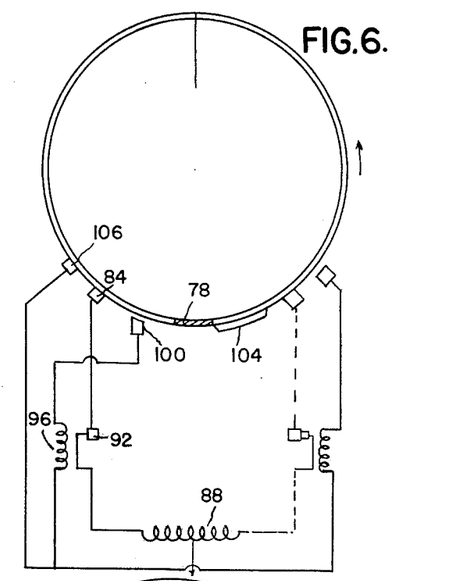

Further rotation of the rotary winding and open collector ring toward the position illustrated in Figure 6 results in the raised contact 104 moving away from the brush 100 and passage of the insulating section 78 away from the stationary contact 84. The parts are arranged and dimensioned so that the raised contact 104 separates from the brush 100 after the insulating section 78 has passed beneath the stationary contact 84. At this time the control circuit through the relay coil 96 is broken at the brush 100 and normally closed switch 92 closes, thus establishing the current circuit to the auto-transformer 88 through both of the stationary contacts 84 and 86.

Figure 7:
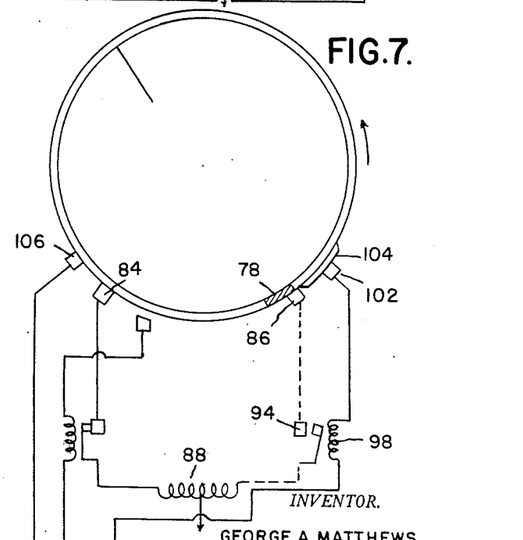

Further rotation of the rotary winding and open collector ring toward the position illustrated in Figure 7 results in the raised and offset contact 104 making contact with the brush 102 thereby establishing a control circuit through the relay coil 98 to the brush 106. This results in opening the switch 94 so that current is taken off only through the stationary contact 84 and through one-half of the auto-transformer 88. Again, line current is thus opposed by the reacting of one-half of the auto-transformer 88 but this is not a serious condition and moreover, as previously mentioned, is merely transient or temporary.

Further rotation of the rotary winding and open collector ring in a counterclockwise direction from the position seen in Figure 7, results in separation between the brush 102 and the raised contact 104, thus breaking the control circuit through the relay coil 98 and permitting normally closed switch 94 to close. The parts are designed so that closure of the switch 94 takes place only after stationary contact 86 has made contact with the collector ring at the opposite side of the insulating section 78.

Figure 8:
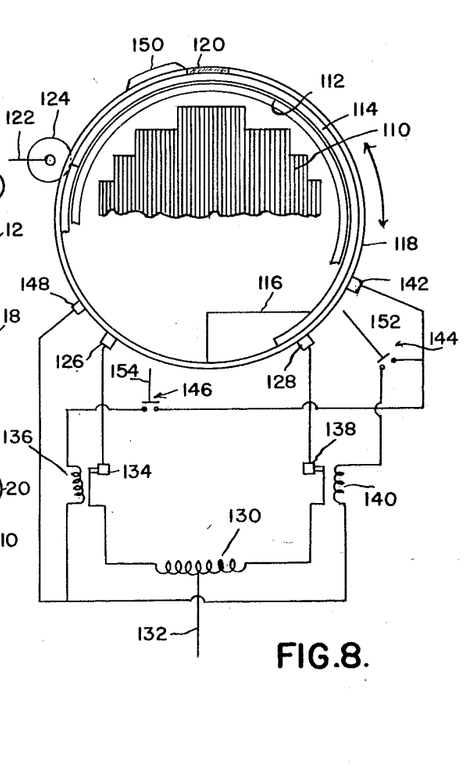
Figure 8 is a view similar to Figure 4 illustrating another embodiment of the present invention.

Referring now to Figure 8 there is illustrated a somewhat different arrangement. In this figure the core is illustrated at 110, a portion of the primary winding at 112, and a portion of the rotary winding at 114. One end of the rotary winding as indicated at 116, is connected to the open collector ring 118, the opening being provided by an insulating section 120. Again, a traveling contact 122 is provided preferably including a grooved roller 124 adapted to engage and be moved by the conductor of the rotary winding 114. Spaced stationary contacts 126 and 128 are provided connected to opposite ends of an auto-transformer 130, the mid-point of which is connected to the main line 132. Intermediate the contact 126 and the auto-transformer 130 is a normally closed switch 134 having associated therewith an actuating relay coil 136. Intermediate the stationary contact 128 and the auto-transformer 130 is a normally closed switch 138 having associated therewith an actuating relay coil 140. A brush 142 is provided in contact with the collector ring and is connected to the relay coil 140 through a normally open control switch 144. It is further connected to the relay coil 136 through a normally open control switch 146. The control circuits through the coils 136 and 140 are completed back to the collector ring through a brush 148. In this case the collector ring 114 is provided with an actuating cam 150 which may be formed of insulating material and which upon rotation is adapted to engage actuating plungers 152 and 154 to close switches 144 and 146 respectively.

The operation of the arrangement illustrated in Figure 8 is substantially parallel to that illustrated in Figures 4 through 7. The cam 150 will close the switches 144 and 146 in timed relation to rotation of the rotary winding and open collector ring so that the switches 134 and 138 are each maintained open during passage of insulating section 120 beneath the respective stationary contacts 126 and 128.

It will be observed that in both of the arrangements illustrated in Figures 4 and 8 that the raised electrical conducting section 104 or the insulating cam section 150 is operable to effect proper control of the stationary contact switches in either direction of rotation.

Figures 11, 12, 13, 14:
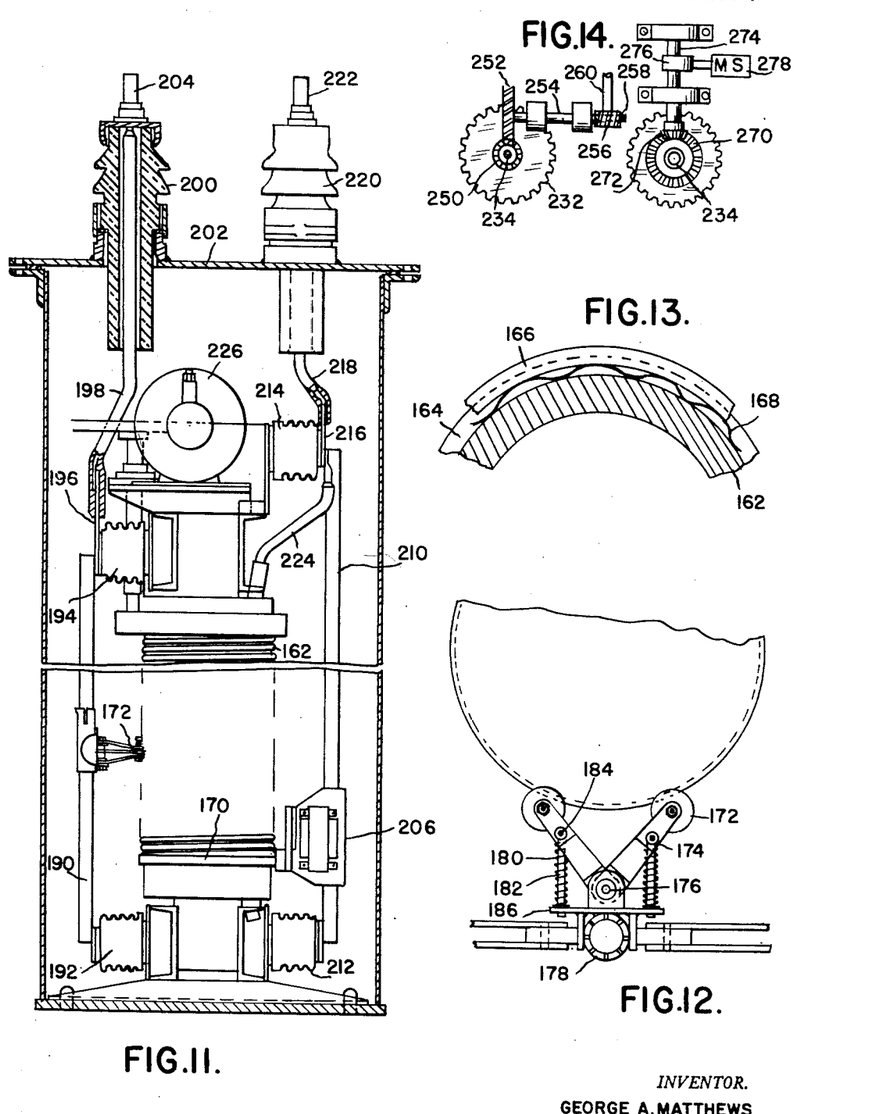
Figure 11 is a fragmentary side elevation with parts in section of the regulator shown in Figure 9.
Figure 12 is a detail plan view showing the construction of the spaced traveling contacts.
Figure 13 is a fragmentary section illustrating the manner in which the windings are mounted in grooves in the rotary insulating support.
Figure 14 is a fragmentary diagrammatic plan view illustrating control and indicating mechanism associated with the drive means for the rotary windings.

Referring now to Figures 9 through 13 there is illustrated a three phase regulator incorporating the present invention. This regulator comprises a tank 160 adapted to be partially filled with oil. Located within the tank 160 are a plurality of rotary insulating supports in the form of cylinders or drums 162, each of which is provided with a helically disposed groove 164 in which is located a continuous helically disposed bare electrical conductor 166. As best seen in Figure 13 the groove 164 is relatively deep, and interposed between the bottom of the groove and the underside of the bare conductor 166 is resilient means 168 herein illustrated as comprising a sinuously bent resilient metal element. This permits expansion and contraction of the conductor in use without injury to the parts and without disturbing the electrical characteristics of the apparatus. At their lower ends the rotary windings constituted by the conductors 166 are each electrically connected to an open collector ring 170. The collector ring includes an insulating section as previously described.

Figures 9, 10:
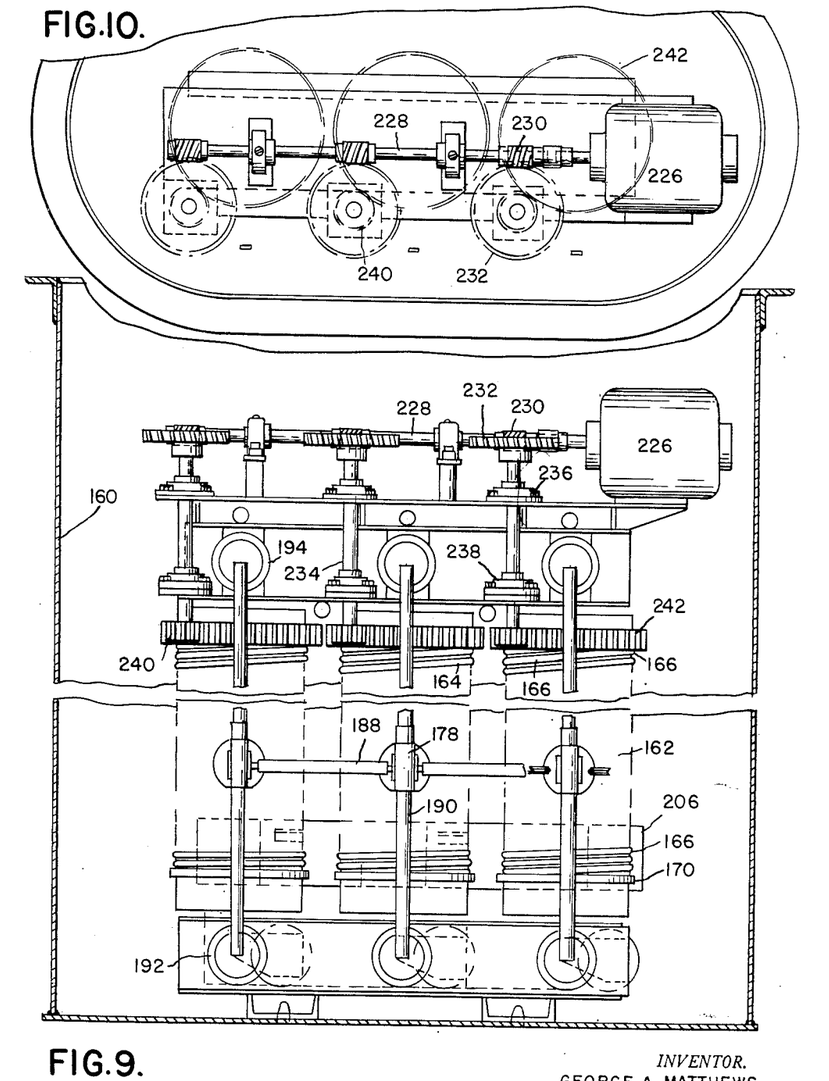
Figure 9 is a fragmentary front elevation with parts in section of a series voltage regulator.
Figure 10 is a fragmentary plan view of the apparatus shown in Figure 9.

Traveling contacts are provided and may conveniently take the form of grooved rollers 172 mounted on arms 174 pivoted as indicated at 176 to a slidable guide 178. Arms 174 are spring biased to cause the rollers 172 to have firm guided engagement with the conductor 166 and this means may take the form of compression springs 180 mounted on pins 182 pivoted as indicated at 184 to the arms 174 and extending through a plate 186 mounted on the guide 178. In order to insure uniform simultaneous movement of each of the sets of rollers 172 axially of the rotary windings, the traveling contacts are interconnected by members 188 as best seen in Figure 9. The tubular guides 178 are each slidably mounted on rods 190 which serve as mechanical guides and supports for the traveling contacts and also as electrical conductors. For this purpose the bars or rods 190 are mounted at their lower ends on insulators 192 and at their upper ends on insulators 194. Secured to the upper ends of the bars 190 are conducting plates 196 to which conductors 198 are secured, these in turn passing through insulating structure 200 provided on the top 202 of the tank and constituting terminals 204 at the top of the tank. The stationary collector ring contacts previously described are illustrated generally at 206 and are carried by bars 210 constituting mechanical supports therefor and also electrical conductors. The bars 210 are supported at their bottom ends on insulators 212 and at the upper ends on insulators 214. Again, conductor plates 216 are secured to the tops of the bars 210 and conductors 218 are connected thereto and pass through openings 202 of the tank, insulators 220 being provided. At their upper ends conductors 218 are connected to terminals 222. Conductors 224 are provided for interconnecting the rotary conductors in the desired relationship.

In order to effect positive drive of the rotary insulating cylinders 162, a motor 226 is provided having a drive shaft 228 provided with a plurality of worms 230 meshing with worm gears 232, the latter being mounted on vertically extending shafts 234 suitably supported by bearings indicated at 236 and 238. At their lower ends the shafts 234 carry driving pinions 240 meshing with gears 242 rigidly secured to the rotary insulating cylinders or drums 162.

Referring now to Figure 14 there is illustrated means associated with the drive mechanism for indicating the electrical position of the traveling contacts and also for preventing stopping of the rotary windings except in a position in which current passes through both of the collector ring contacts. As seen in this figure, one of the vertical shafts 234 extends upwardly above the worm gears 232 and is provided with a small worm 250 which meshes with a worm gear 252 mounted on a shaft 254. At the opposite end of the shaft 254 is a second worm 256 meshing with a worm gear 258 connected to a shaft 260 which may drive suitable mechanism to indicate the electrical position of the traveling contacts and hence the number of turns of the rotary windings included in the circuit.

The mechanism for preventing stopping of the collector ring except in a position in which current passes through both of the collector ring contacts, comprises a bevel gear 270 connected to one of the vertical shatfs 234 and connected to a bevel gear 272 driving a shaft 274. Located on the shaft 274 is a cam 276 designed to control a switch 278. The switch 278 is located in the control circuit for the motor 226 and the cam 276 is designed so that the motor 226 will stop only when both of the switches 92 and 94 (in the arrangement illustrated in Figure 4) or 134 and 138 (in the embodiment of the invention illustrated in Figure 8) are closed so that current passes in parallel through both of the stationary contacts associated with the open collector ring.

Figure 15:
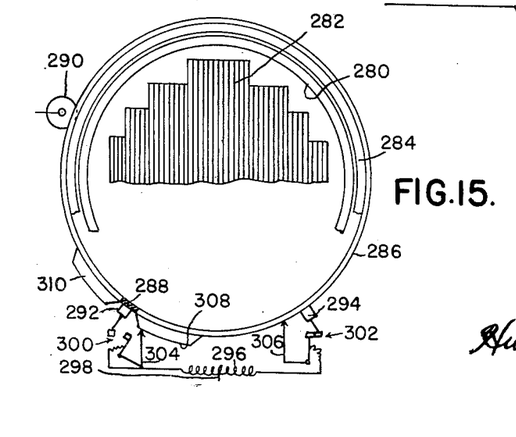
Figure 15 is a diagrammatic view illustrating another embodiment of the present invention.

Referring now to Figure 15 there is illustrated another embodiment of the present invention in which mechanical means are employed for direct actuation of the switches for breaking the circuit. In this figure a portion of the primary winding is indicated at 280 disposed about a core 282. A portion of the rotary winding is illustrated at 284 and this winding as in the previous embodiments of the invention, takes the form of a bare electrical conductor disposed in a helical path. At one end the rotary winding is electrically connected to an electrically open collector ring 286, the ring having an insulating insert 288 therein.

A traveling contactor 290 is provided which is adapted to ride up and down the rotary winding as the support for the winding is rotated.

In order to take off current at the non-regulating end of the rotary winding, spaced contacts 292 and 294 are provided in contact with the collector ring 286. Each of these contacts 292 and 294 is connected to opposite ends of a preventive auto-transformer 296 and the current is taken off from the mid-point of the auto-transformer by the line 298. The auto-transformer operates in this embodiment of the invention in precisely the same manner as previously described.

In this case the connections between contacts 292 and 294 and the respective ends of the auto-transformer 296 include normally closed switches 300 and 302. While the mechanical details of the switches may be varied widely in accordance with well known practice, they are diagrammatically illustrated herein as comprising pivot levers to which mechanical actuating means 304 and 306 are connected.

Associated with the rotating collector ring 284 are cams 308 and 310. Preferably, the actuators 304 and 306 are located in different planes perpendicular to the axis of rotation of the rotating winding and the cams 308 and 310 are positioned so that the cam 308 is operable to open the switch 300 and the cam 310 is operable to open the switch 302 by engagement with the actuator 306.

The location of the cams 308 and 310 with respect to the insulating section 288 of the collector ring is such that the switches 300 and 302 are mechanically held in open position as the insulating section 288 passes beneath the contacts 292 and 294 respectively.

It will be appreciated that the regulating transformer uses standard core construction of fixed ratio transformers and the primary or high voltage winding is mounted on the core in the usual fashion. The regulating portion of the winding is a single layer of winding of bare conductor helically wound on the insulating cylinder in the helically disposed grooves thereon.

While specific means designed to prevent sparking at the collector ring have been illustrated as associated with the take-off contacts at the collector ring, it will be appreciated that for units of relatively small rating, the construction may be simplified by omitting the switches and auxiliary switch control circuits. The simplified form is of course used when the degree of arcing at the stationary contacts is not objectionable at the collector ring.

For units in which arcing at the collector ring is objectionable the pair of stationary contacts in combination with the auxiliary switches therefor operate to disconnect each brush from the circuit prior to its contacting the gap or insulating section in the collector ring and to connect the stationary contact into the circuit just afer the gap has passed. This has the effect of transferring the arcing which would otherwise occur at the stationary contacts to the contacts of the exterior switches.

The two stationary contacts of a pair are electrically connected together through a preventive auto-transformer which limits the circulating current of the one-turn collector ring to a value which is not objectionable, when the pair of brushes straddle the opening in the collector ring. The arcing at the contacts of the exterior switches is slight and not at all vicious due to the fact that the preventive auto-transformer limits the current to approximately one-half load current (depending of course on the design of the auto-transformer) and the contacts interrupt this current at turn voltage which normally is less than 100 volts. The operating coils of the switch control relays are energized by the open collector ring voltage so that the collector ring need not be at ground potential. The operation of the switches is automatic and does not therefore require auxiliary control power.

It is pointed out that in addition to preventing arcing taking place at the collector ring contacts or in the insulating oil, the provision of the stationary contact switches exterior of the tank is also desirable since it renders them accessible for inspection and maintenance.

It is to be further noted that should the switches fail to operate during voltage change operation, arcing would occur at the collector ring contacts, which is not hazardous but would cause increased maintenance due to carbonization of the oil, if it is oil filled apparatus.

When the regulating rotary winding is rotating in a direction to raise the voltage, there is a drop in voltage of approximately half the turn voltage as the first exterior switch opens the circuit to the corresponding stationary contact as the gap or insulating section in the ring approaches it. When its circuit is remade after the gap has passed beneath the stationary contact the voltage is raised by one turn. The same action then takes place as the gap approaches and passes the second stationary contact, leaving the phase voltage increased by one turn until the cylinder makes another revolution. Desirably in a three phase regulator, the gaps in the collector rings are displaced by 120 degrees so that individual changes in voltage in the different phases will not occur simultaneously, thereby providing for minimized increments.

The novel regulator disclosed herein is adaptable for a variable series regulator in a circuit, or it can be adapted for a combined transformer and regulator. In the latter case, it requires little or no more space than that required for a fixed-ratio transformer of the same rating, and has nearly identical characteristics as regards core and copper losses, regulation, insulation, short circuit strength, and cooling properties. It is particularly well adapted to moderate-to-large size units, since in the larger sizes the voltage per turn of winding is greater, which means that less turns are necessary on the rotating winding. This, and the larger conductor sections make for greater clearances and increased strength of assembly.

One of the striking features of the present invention is its great simplicity as compared with modern step-type regulators. The provision of a multiplicity of leads necessary for step-type regulators is completely avoided. This is a great advantage since it is generally recognized that tapping of a transformer winding and the bringing out of the tap-leads is a potential source of trouble, usually resulting from the electrical insulation failure between the taps and the winding proper.

As compared to regulating transformers, having in combination induction regulators for voltage regulation, no added space for the new regulating element is required in the present construction. Further comparison shows that the electrical characteristics are better, and the in-phase voltage output is advantageous in most cases for switching and paralleling circuits.

The volts per turn of winding is of particular interest in this new arrangement, because the volts per turn govern the number of turns required on the rotating or regulating windings. In the simplest form, a rotating winding regulator provides voltage regulations in increments of one turn.

There are various arrangements which could be used to split or subdivide the one-turn voltage, but they involve added equipment which is not ordinarily justified in meeting commercial requirements.

By way of a specific example, the standard practice on a nominal 5-kv. distribution line is to provide voltage regulation in ⅝-percent steps which would be 31-volt increments. In the simplest form of a three phase Y-connected regulator, the one-turn steps can be displaced 120 degrees apart and 36 volts per step can be handled without exceeding established flicker limits. With usual flux densities this corresponds to about a 180 square inch core cross section, or roughly a 7500-kva. unit. Phase-to-neutral voltage would be 2900 volts, a 10 percent boost would require 290 volts of regulation on each rotating winding, or in other words 8 turns at 36 volts a turn. However, if plus-minus 10 percent regulation is required 16 turns (boost) are required on the rotating winding and the fixed turns diminished by 10 percent. Thus, with the regulating winding at "all low" the output voltage would be 10 percent below the base voltage, and at "all-raise" the output voltage would be 10 percent above the base voltage.

For a second example, a 24/5-kv. regulating transformer might use a 400 turn primary winding, a 72 turn stationary secondary winding, and a 16 turn rotating secondary winding. Thus the base number of turns in the total secondary is 80. Core section, core windows, weight, oil volume, overall dimensions and electrical characteristics would differ little from a fixed-ratio-transformer of like rating.

The new voltage regulator eliminates tapped windings and the incident tapped leads, thereby eliminating the insulation problems at this point. The multiplicity of tap-changing contacts, with the inherent weaknesses of such arrangement is eliminated. Considerable reduction in overall weight is provided by applying the new voltage regulating scheme to power transformers for voltage regulation. The rotating coil voltage regulating element can be built into the transformer core and coil structure without appreciably increasing the overall size of a regulating transformer as compared to a non-regulating transformer. The maintenance work involved with the new regulating device will be less than that required for other types of voltage regulating equipment, because many of the troublesome conditions of present day step regulators have been eliminated.

The drawings and the foregoing specification constitute a description of the improved electrical regulating apparatus in such full, clear, concise and exact terms as to enable any person skilled in the art to practice the invention, the scope of which is indicated by the appended claims.

What I claim as my invention is:

1. A regulator comprising core structure having primary and secondary windings, one of said windings including a rotary insulating support, a low resistance collector ring on said support in position to be linked by flux in said core structure having an insulating section therein constituting an electrical gap, a plurality of turns of bare conductor connected at one end to said collector rings and disposed on said support in a helical path, a traveling contact mounted for movement axially of said support and engaging said conductor, means for maintaining said contact in engagement with said conductor to move said contact axially of said support on rotation of said support, and stationary contact means engageable with said collector ring.

2. A regulator as defined in claim 1 in which said stationary contact means comprises a pair of main contact members spaced apart circumferentially of said ring a distance in excess of the circumferential extent of said insulating section, a preventive auto-transformer connected between said contact members and a line connection to the mid-point of said transformer.

3. A voltage regulator as defined in claim 2, comprising switch means intermediate each main contact member and the transformer, and means operable to open each of said switch means prior to opening the circuit at the adjacent main contact by passage of said insulating section beneath said main contact.

4. A voltage regulator as defined in claim 3, said means being operable to close said switch means only after the adjacent main contact is again in electrical contact with the conducting portion of said collector ring.

5. A voltage regulator as defined in claim 2 comprising switch means intermediate each main contact member and the transformer, and means operable upon rotation of said support to maintain each of said switch means open while the insulating section of said collector ring passes beneath the main brush adjacent thereto.

6. A voltage regulator as defined in claim 5 including means for rotating said support, and means for preventing stopping of said support in a position in which either of said switches are open.

7. In a regulator comprising a rotary winding and a collector ring connected thereto having an insulating section therein, a pair of main contacts engaging said collector ring, a preventive auto-transformer connected between said main contacts, a switch intermediate said transformer and each of said main contacts, and means including a part rotatable with said rotary winding and collector ring effective to open the switch associated with each of said main contacts prior to breaking the circuit at each main contact by passage of said insulating section therebeneath.

8. In a regulator comprising a rotary winding and a collector ring connected thereto having an insulating section therein, a pair of main contacts engaging said collector ring, a preventive auto-transformer connected between said main contacts, a switch intermediate said transformer and each of said main contacts, and means including a part rotatable with said rotary winding and collector ring effective to maintain each of said switches open during passage of said insulating section beneath the main contact adjacent said switch.

9. Structure as defined in claim 8 in which said means comprises relay coils for controlling said switches.

10. Structure as defined in claim 8 in which said means comprises relay coils for controlling said switches and brushes engageable with circumferentially spaced portions of said collector ring to apply single turn voltage to said relay coils.

11. Structure as defined in claim 9 in which said switches are normally closed, said relay coils are disposed when energized to open said switches, and including a first brush contacting said collector ring, a pair of brushes connected in parallel to said first brush spaced circumferentially of said collector ring and out of contact therewith, a projection on said ring electrically connected thereto and positioned to contact said pair of brushes in sequence upon rotation of said ring, each of said windings being in series with one of said pair of brushes.

12. Structure as defined in claim 8 in which said means comprises mechanically actuated means for controlling said switches.

13. Structure as defined in claim 12 in which said switches are normally closed, cam means rotatable with said ring effective to open each of said switches just prior to passage of said insulating section beneath the main brush adjacent to said switch.

14. A regulator comprising a core having primary and secondary windings including a rotary winding, a low resistance rotary collector ring connected to said rotary winding in position to be linked by flux in said core and having an insulating section therein, a traveling contact engaging said rotary winding and movable axially of said rotary winding upon rotation thereof, a pair of main contacts engaging said collector ring and spaced circumferentially with respect thereto, an enclosure adapted to contain such windings and associated apparatus, connections to each of said main contacts connected to opposite ends of a preventive auto-transformer, a switch in each of said connections, said switches being located outside said enclosure, and means operable upon rotation of said rotary winding and ring to actuate said switches to break the circuits to said main contacts during passage of said insulating section therebeneath.

15. A regulator comprising a core having primary and secondary windings including a rotary winding, a low resistance rotary collector ring connected to said rotary winding in position to be linked by flux in said core and having an insulating section therein, a traveling contact engaging said rotary winding and movable axially of said rotary winding upon rotaton thereof, a pair of main contacts engaging said collector ring and spaced circumferentially with respect thereto, an enclosure adapted to contain such windings and associated apparatus, connections to each of said main contacts passing out of said enclosure and connected to opposite ends of a preventive auto-transformer, a switch in each of said connections located outside said enclosure, and means operable upon rotation of said rotary winding and ring to actuate said switches to break the circuits to said main contacts during passage of said insulating section therebeneath.

16. A regulator as defined in claim 15 in which the enclosure constitutes a tank adapted to contain oil to a level to submerge the contacts and windings therein.

17. A regulator comprising a core having primary and secondary windings including a rotary winding, a low resistance rotary collector ring connected to said rotary winding in position to be linked by flux in said core and having an insulating section therein, a traveling contact engaging said rotary winding and movable axially of said rotary winding upon rotation thereof, a pair of main contacts engaging said collector ring and spaced circumferentially with respect thereto, and connections to each of said main contacts connected to opposite ends of a preventive auto-transformer.

18. In a regulator, an insulating drum having a continuous groove in its outer surface, a winding in said groove comprising a bare conductor, and resilient means interposed between the bottom of said groove and said conductor.

19. Structure as defined in claim 18 in which said resilient means comprises a continuous sinuously bent metal strip.

20. A three phase regulator comprising three rotary supports disposed with their axes parallel, a winding comprising a bare conductor on each of said supports, a collector ring electrically connected to each of said windings, an insulating section in said collector ring, a traveling contact for each of said windings movable along said bare conductor upon rotation of said supports, stationary contact means engageable with each of said collector rings, said stationary contact means each comprising circumferentially spaced main contacts connected in parallel, a preventive auto-transformer connected between each pair of main contacts, switches between each auto-transformer and its main contacts, drive means interconnecting each of said supports, motor means for rotating said supports through said drive means, and motor control means operable to prevent stopping said motor in a position in which any of said switches are open.

21. A three phase regulator comprising three rotary supports disposed with their axes parallel, a winding comprising a bare conductor on each of said supports, a collector ring electrically connected to each of said windings, an insulating section in said collector ring, a traveling contact for each of said windings movable along said bare conductor upon rotation of said supports, stationary contact means engageable with each of said collector rings, said stationary contact means each comprising circumferentially spaced main contacts connected in parallel, a preventive auto-transformer connected between each pair of main contacts, switch means operable upon rotation of said supports to break the circuit to each of said main contacts as said insulating section passes therebeneath, drive means interconnecting each of said supports, motor means for rotating said supports through said drive means, and motor control means operable to prevent stopping said motor in a position in which any of said switches are open.

22. In a regulator of the character described, a rotary winding having a traveling contact movable axially along said winding as said winding rotates, a collector ring electrically connected to said winding, an insulating section in said ring, stationary contacts in contact with said ring, switches in series with said stationary contacts, relays for controlling said switches and relay circuits including brushes engageable with circumferentially spaced portions of said ring to apply single turn voltage to said relays.

GEORGE A. MATTHEWS.

REFERENCES CITED

The following references are of record in the file of this patent:

UNITED STATES PATENTS

| Number | Name | Date |
| --- | --- | --- |
| 733,951 | Erie | July 21, 1903 |
| 1,112,908 | Hubbard | Oct. 6, 1914 |
| 1,696,964 | Morrison | Jan. 1, 1929 |
| 2,374,974 | Blume | May 1, 1945 |
| 2,449,367 | Boyajian | Sept. 14, 1948 |

FOREIGN PATENTS

| Number | Country | Date |
| --- | --- | --- |
| 325,497 | Italy | Mar. 22, 1935 |
| 289,399 | Germany | Dec. 22, 1915 |
| 616,704 | Great Britain | Jan. 26, 1949 |